Nov. 9, 1954　　　　　C. G. TAYLOR　　　　　2,693,920
ADJUSTABLE LIFT-PROPULSION DEVICE FOR AIRCRAFT
Filed Dec. 17, 1951　　　　　　　　　　　3 Sheets-Sheet 1

INVENTOR.
C. GILBERT TAYLOR
BY
*Willard A. Eakin*
ATTORNEY

Nov. 9, 1954           C. G. TAYLOR           2,693,920
ADJUSTABLE LIFT-PROPULSION DEVICE FOR AIRCRAFT
Filed Dec. 17, 1951                        3 Sheets-Sheet 2
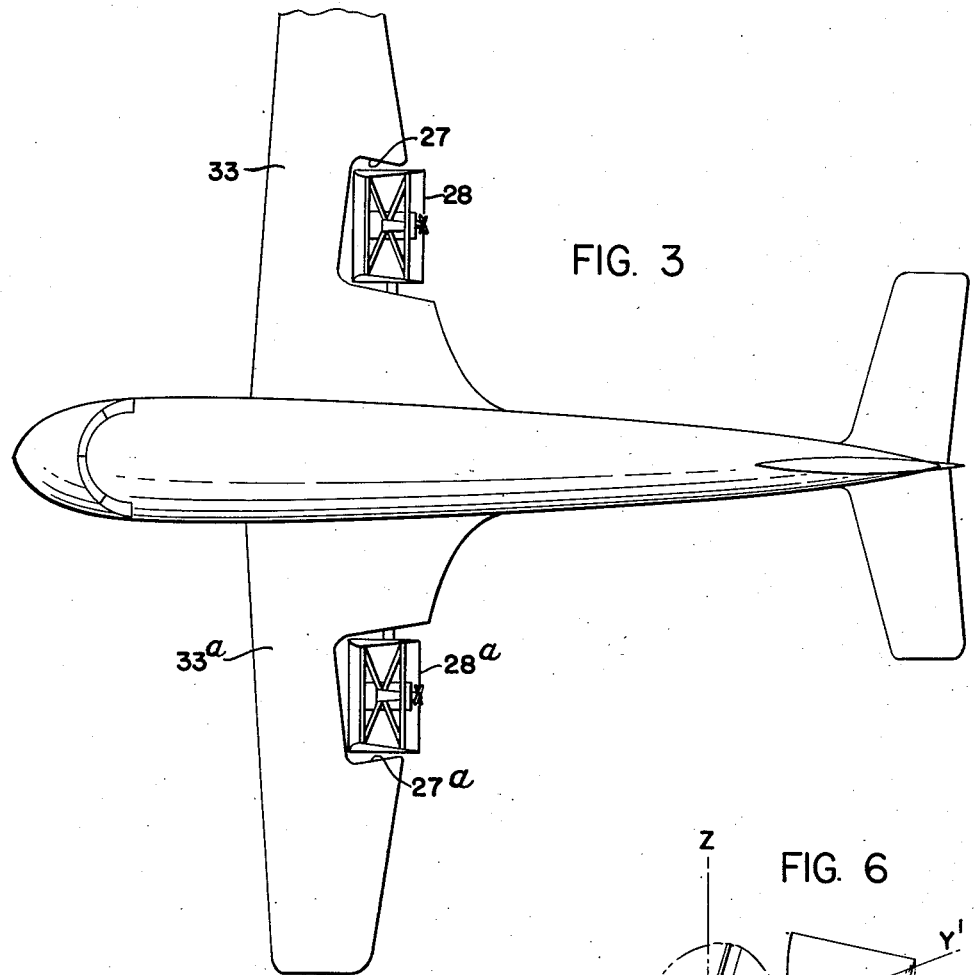
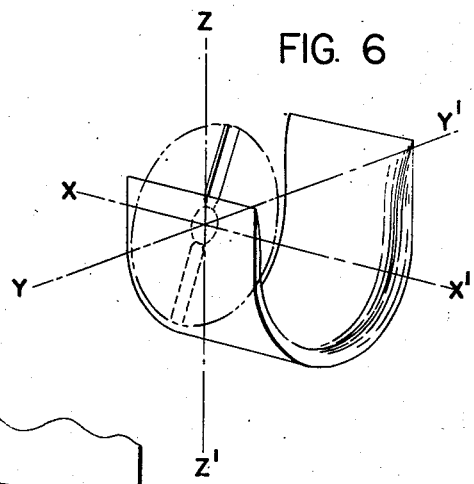
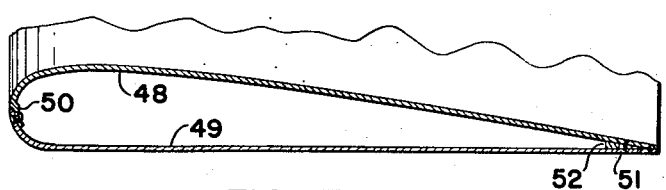
INVENTOR.
C. GILBERT TAYLOR
BY *Willard D. Eakin*
ATTORNEY Nov. 9, 1954        C. G. TAYLOR        2,693,920

ADJUSTABLE LIFT-PROPULSION DEVICE FOR AIRCRAFT

Filed Dec. 17, 1951        3 Sheets-Sheet 3

*INVENTOR.*
C. GILBERT TAYLOR

BY *Willard D. Eakin*

ATTORNEY

United States Patent Office 2,693,920
Patented Nov. 9, 1954

2,693,920

ADJUSTABLE LIFT-PROPULSION DEVICE FOR AIRCRAFT

Clarence Gilbert Taylor, Alliance, Ohio

Application December 17, 1951, Serial No. 262,031

5 Claims. (Cl. 244—15)

This invention relates to an aeronautic vehicle in which a unit comprising a propeller or its equivalent impels a stream of air backward through an aerodynamic element or wing of upwardly open channel form with the stream of air having such direction in relation to the said element that it produces an upward net force upon the said element.

Devices of this general character have been known heretofore and it has been proven that they are highly efficient in the development of lift, even with the craft held stationary in relation to the ground. So far as I am aware, however, change of direction or strength of the upward aerodynamic force sustained by the unit has been effected only by changing the angular relation of the channel wing to the propeller, by swinging of the wing upon a horizontal axis, which varies the efficiency of the unit. Also, so far as I am aware, no provision has been made for turning of the unit, or any part of it, upon a vertical axis, for rightward and leftward variation of the terrestrial direction of the net aerodynamic force sustained by the unit, or for turning the unit, or any part of it, upon a fore-and-aft axis for that purpose.

My chief objects are to provide an improved aerodynamic device by correcting some or all of the deficiencies above set out; to provide a craft adapted for a more nearly vertical take off than has been possible with the earlier craft referred to; to provide for conveniently trimming such a vehicle to compensate for loss of power of one or more motors of a multi-motor craft; to provide simplicity, lightness, compactness, strength and economy of structure; to provide low head resistance of parasitic parts; and to provide improved efficiency throughout the ranges of land speed and rates of climb.

I attain these objects by mounting the channel wing and its propeller as a unit in the angular relation, with regard to angle of attack, in which they have the highest efficiency, and providing for adjustment of this unit as a whole about a horizontal transverse axis, with the propeller and wing remaining in their optimum angular relationship; by providing for adjustment of the unit as a whole about a vertical axis and preferably also about a fore-and-aft axis, as an alternative or as an additional expedient, for compensatory trimming of the craft, as above mentioned; and by making the wing of shell-like metal pieces of which at least some have curvature in a plurality of dimensions, so that the wing will have, in conjunction with lightness, a high degree of strength, preferably such as to permit the wing to have its mounting support at one side only of its channel.

Of the accompanying drawings:

Fig. 3 is a plan view of an airplane of conventional type modified by the incorporation therein of two of the channel-wing units.

Fig. 6 is a diagrammatic illustration of the adjustments provided for the channel-wing unit of Figs. 3, 4 and 5.

Fig. 7 is an axially-extending section of one of the channel wings, showing a preferred type of construction for providing, with lightness, the strength necessary for the type of one-side mounting that is shown in Figs. 3, 4 and 5.

Figure 1:
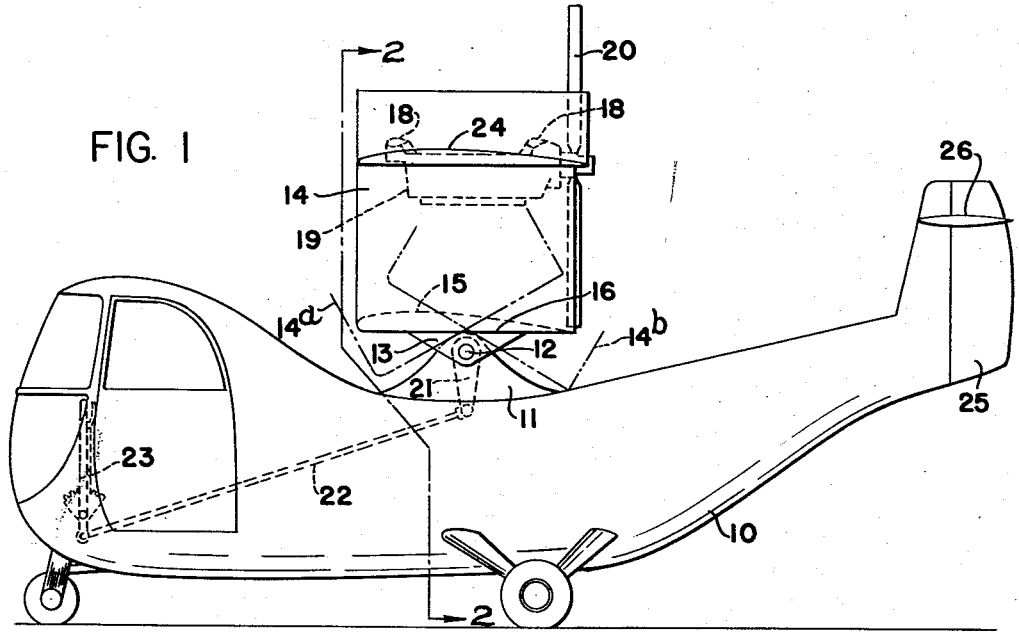
Fig. 1 is a side elevation of an aircraft embodying my invention in a simple form, and employing only one of the channel-wing assemblies.
Figure 2:
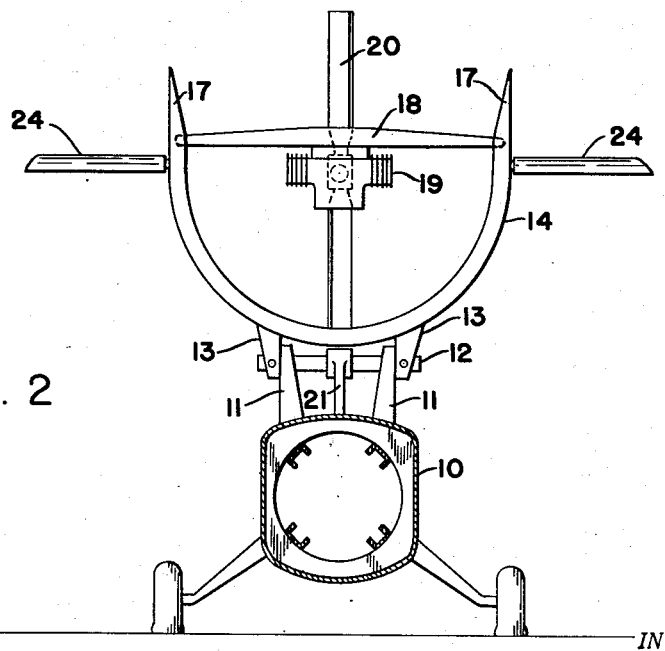
Fig. 2 is a section on line 2—2 of Fig. 1.

Referring first to the embodiment that is shown in Figs. 1 and 2, the aircraft body or fuselage, 10, has projecting upward from it, a pair of bearing-brackets 11, 11, in the upper ends of which is journaled a rock-shaft 12. Secured upon the respective ends of the rock-shaft 12 are the lower ends of spaced-apart supporting legs 13, 13 which are rigid with and project downward from the lower side of the channel element 14.

In fore-and-aft section this channel element has a shape corresponding to that of any conventional or desirable airfoil, as illustrated by the dotted line 15 and full line 16 in Fig. 1. In transverse section it preferably is substantially of U-shape, as shown in Fig. 2, and is of diminishing thickness in the upper margins of the arms of the U, as shown at 17, 17.

Connecting and rigid with the legs of the U near their upper ends is a bridge structure 18, to the under side of which is fixedly secured a motor 19 which has mounted upon its shaft a propeller 20. The invention is not wholly limited, however, to a motor locally mounted for driving the propeller.

The propeller preferably is at the rear of and at least partly within the channel of the channel element 14, with the blades just clearing the inner wall of the channel, so that the blades will impel air rearwardly substantially throughout the cross-section of the channel.

The channel element 14, bridge structure 18, motor 19, and propeller 20 constitute a hinged unit in which the propeller has fixed angular relation to the channel element, preferably such as to provide the maximum lift-drag ratio for the channel element, drag being equal and opposite to the axial forward thrust of the propeller and lift being considered, regardless of tilting of the unit, as the aerodynamic force at right-angles to the chord of the channel member at its middle fore-and-aft plane.

For tilting the unit, and holding it in the different attitudes, the rock-shaft 12 has secured to its middle a downwardly extending rocker arm 21 which is connected by a push-and-pull rod 22 running to a suitable lever, ratchet and pawl assembly 23 mounted in the cock-pit.

Possible positions of adjustment of the channel element 14 are indicated by the dotted lines 14ª and 14ᵇ in Fig. 1.

In this embodiment conventional wings are not employed, the chanel wing providing sufficient lift when of suitable size in relation to the weight of the craft.

The center of gravity can be low by reason of the fact that with backward tilting of the channel-wing unit the net aerodynamic force sustained by the craft, not being wholly dependent upon forward movement of the craft through the air, can be a vertical or nearly vertical force. However, for lateral stability at fast ground speed, it is desirable to have the center of gravity reasonably close to the center of lift and to have small ailerons 24, 24 (with suitable controls, not shown). For maximum leverage the ailerons are here shown as being mounted on the outer sides of the widest part of the channel element.

The tail surfaces, including a rudder 25 and elevator 26, are here shown as being high, so that they will not be too much in the blast of the propeller. The pilot's compartment is shown as being high, to avoid an excessively low center of gravity while having clearance between the fuselage and the wing unit large enough to permit wide-range tilting of the latter in relation to the fuselage. At the same time, the top of the pilot's compartment is not so high as to interfere excessively with the efficiency of the channel wing. The top of the compartment, sloping downwardly and rearwardly, can supplement, to some extent, the lifting effect of the wing.

The mode of operation of the embodiment just described will be clear from the foregoing description, and it will be manifest that the craft can take off from a very short runway, or, with suitable proportions, can have a vertical net aerodynamic force, imposed upon it, as the resultant of the forwardly inclined thrust of the propeller and the backwardly inclined "lift" as above defined, so that the craft can take off vertically, and without the fuselage sustaining excessive yawing torque reaction of the propeller.

Preferably the center of gravity is sufficiently low to nullify rolling torque reaction of the propeller.

In the embodiment shown in Figs. 3 to 7, each of the wings of a conventional aeroplane is notched out at the rear, as at 27, 27ª, Fig. 3, to accommodate propelling channel-element units, 28, 28ª, similar to the one above described. The invention is of course not limited to the particular number of such units.

Each of the units, comprising a channel element 29, bridge structure 30, motor 31 and propeller 32, is here shown, Figs. 4 and 5, as being connected to the wing 33 or 33ª of the plane only at one side of the channel member, the latter, by reason of its type of construction hereinafter described, having sufficient cantilever strength to sustain the weight of the unit when the craft is at rest and to sustain the aerodynamic force imposed upon the wing by the unit when the craft is in flight.

The connection between the unit and the wing, as it will be hereinafter described, is such that, in relation to the wing, considered as being horizontal, the unit can be angularly adjusted about a horizontal transverse axis $y$—$y$, Fig. 6, for varying toward and from vertical the resultant of the propeller's forward thrust and the "lift" of the channel element; about a vertical axis $z$—$z$ for directing that resultant rightwardly or leftwardly, as for trimming the craft to compensate for failure or partial failure of one or more motors; and about a fore-and-aft axis $x$—$x$, this adjustment also having the effect of directing the mentioned resultant rightwardly or leftwardly, and thus being employable as either an alternative or a supplement to the adjustment about the vertical axis $z$, $z$.

In Fig. 3, the notch 27 at the right-hand side of the plane is shown as being shaped to provide clearance chiefly for turning the unit to the right from its normal position, and the opposite is shown at the left-hand side of the plane.

Assuming that the left-hand motor, of the unit 28ª, has ceased to function, the right-hand unit, 28, is turned by turning of its axle shaft 12, so that the net aerodynamic force sustained by the unit is farther from vertical and is thus more forwardly directed. This avoids such excessive lift of the unit 28 in relation to that of the "dead" unit 28ª as would excessively roll the craft to the left. This adjustment, while thus making the right hand unit 28 less effective as a lift element, with respect to the craft as a whole, also makes it more effective as a propelling element, to compensate at least partially for the loss of propulsion in the left-hand unit 28ª.

All of the propulsion, and accordingly the center of thrust, now being on the right hand side, however, there would be, in the absence of further adjustment, a yawing of the plane to the left, slowing and thus decreasing the lift of the left wing assembly and/or speeding up and thus increasing the lift of the right wing assembly, with consequent roll of the craft to the left.

This can be prevented by appropriate application of rudder and, with the right hand acting as a propulsion element rather than a lift element, and with the angle of attack of the main wings appropriately increased, the craft can proceed to its destination, as in the case of a conventional plane.

The other adjustments provided for the channel unit, however, make it possible for the craft to proceed with better efficiency and consequently with greater speed.

As above indicated, the right hand unit, in the situation assumed, can be turned to the right, about the vertical axis $z$—$z$, Fig. 6, and/or tilted about the fore-and-aft axis, $x$, $x$, Fig. 6, with or without supplemental application of rudder.

The immediate effect is the production of an oblique force upon the craft as a whole, which urges the craft in the direction of the oblique force and thus produces dominant impact upon the righthand side of vertical tail surfaces. This is supplemented by increased drag of the right-hand unit itself, with respect to the original direction of travel, the result being resistance of yawing of the craft to the left. This, being a retardation of the right wing 33 and a relative acceleration of the left wing 33ª, tends to equalize the lift at the two sides of the plane in spite of loss of propulsion and partial loss of lift of the left-hand channel unit 28ª.

As the craft further proceeds, the propulsive force of the right-hand channel unit 28 continues to be oblique to the craft as a whole, being given a direction such as to contribute to lateral and longitudinal stability and proper direction of travel.

If the axis $z$—$z$ adjustment and resulting tail-surface effects are not sufficient, without excessively heavy rudder, to maintain speed and lift of the left-hand side of the plane equal to those of the right-hand side, that result can be contributed to by further change of direction of the net aerodynamic force applied by the unit 28 to the rest of the craft. Tilting the unit 28 to the right about its fore-and-aft axis, $x$—$x$, will lessen the component of its force that is perpendicular to the chord of the main wing 33, which is lift in the sense of being a supplement to the lift of the wing 33, thus lessening the lift of the right-hand side of the craft to compensate for the decrease of lift of the left-hand channel element 28ª. Such rightward tilting, like the rightward turning, of the right-hand unit 28, also will increase the drag of the unit itself, with respect to the craft's line of travel, and thus assist the tail surfaces in maintaining equal speed and equal lift of the two sides of the plane.

Figure 4:
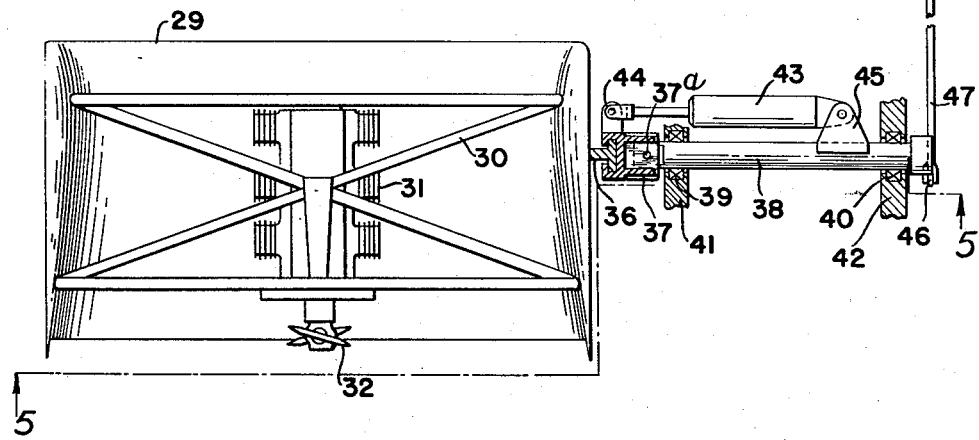
Fig. 4 is a view from above, on a larger scale, of the left-hand one of the channel-wing assemblies shown in Fig. 3, with parts sectioned on line 4—4 of Fig. 5.
Figure 5:
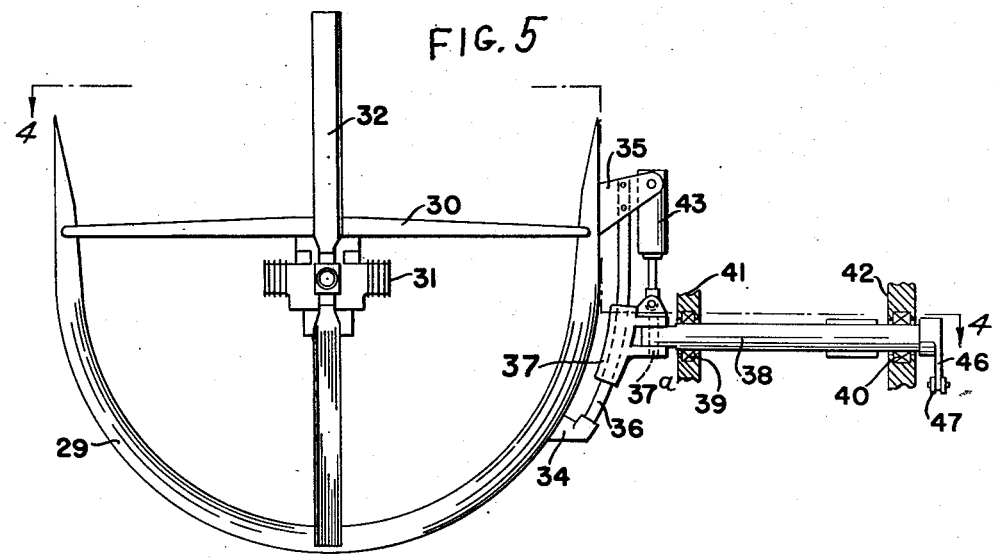
Fig. 5 is an elevation, from the rear, of the assembly shown in Fig. 4, with parts sectioned on line 5—5 of Fig. 4.

In the embodiment here shown, in Figs. 3 to 7, the mounting of the right-hand unit 28 is a mirror image of that of the left-hand unit 28ª, in view of which a description of the latter, shown schematically in Figs. 4 and 5, will be sufficient.

This mounting comprises a pair of vertically spaced apart brackets 34, 35 rigidly projecting outwardly from one of the side arms of the channel element 29. These brackets are rigidly connected by a guide rail 36, which is curved about the fore-and-aft axis of the channel element as a center of curvature. This guide-rail preferably is of non-circular section, and permissibly of T section, when only one such guide-rail is present, to provide strong holding of the channel element against undesired turning about its vertical axis, while also providing strength against bending in the plane of its curvature.

Slidably mounted upon the guide-rail 36 is a correspondingly curved slide 37 which is mounted as a knuckle-joint head, with a vertical axis 37ª, upon a rock-shaft 38, the latter being journaled by bearings 39, 40, in structural elements 41, 42 of the wing 33ª (Fig. 3).

Suitable means, such as a vertical hydraulic-cylinder assembly 43, connects the upper bracket, 35, with the knuckle-joint head 37, for running the guide-rail 36 in the knuckle-joint head 37 and thus adjusting the channel element 29 about its fore-and-aft axis, $x$—$x$ of Fig. 6.

At the forward side of the shaft 38, and obscured by it in Fig. 5, a hydraulic-cylinder assembly 43 connects a forward projection 44 on the knuckle-joint head (Fig. 4) with a bracket 45 secured upon the shaft, for adjusting the channel element 29 about its vertical axis, $z$—$z$ of Fig. 6.

At its end farthest from the channel element the shaft 38 is provided with a rocker arm 46 having manual control means, inclusive of a link 47, for adjusting the channel element about its transverse horizontal axis, $y$—$y$ of Fig. 6.

To provide, in conjunction with lightness, adequate strength of the channel element for it to have only one of its arms connected to the wing 33ª, the channel element preferably is made as shown in Fig. 7, in which the element comprises two shell-like, formed sheet, pieces 48, 49, suitably joined at their forward margins in a seam 50 and joined at their rear margins in a seam 51.

As each of the pieces is curved in large parts of its extent in a plurality of the three dimensions and as the structure as a whole has the strength of hollow form it can be adequately strong without internal bracing.

The mode of operation has been set out above.

Modifications are possible without departure from the scope of the invention as defined in the appended claims.

I claim:

1. An aerodynamic device comprising a support, an assembly hingedly mounted on said support, said assembly comprising an airfoil member defining a channel for the passage of a slip-stream through its said channel and means fixed in relation to said airfoil member for impelling a stream of air in such direction through the said channel of said airfoil member as to provide an aerodynamic force upon the said airfoil member in a direction transverse to that of the said stream of air, and means for turning said airfoil member and said impelling means as a unit, about the hinge axis of said assembly, in relation to said support.

2. A device as defined in claim 1 in which the airfoil member, in section transverse to the direction of relative movement of the recited stream of air, is of open U form.

3. A device as defined in claim 1 in which the recited assembly is hingedly mounted upon a plurality of axes in relation to the recited support.

4. A device as defined in claim 1 in which the recited airfoil is of upwardly open U form, is hinged to the support at one of its sides, as its only strain-sustaining connection to the support, and comprises, as a wall, a shell member of which a portion is curved in a plurality of the three dimensions.

5. A device as defined in claim 1 in which the specified airfoil member, constituting a part of the hinged assembly, comprises a hollow-shell member which defines the slip-stream channel as specified, the wall of said member which defines the hollow space within it being of substantially rigid material and constituting substantially the only strength-giving element of said member, a portion of the said wall being curved in a plurality of the three dimensions.

References Cited in the file of this patent

UNITED STATES PATENTS

| Number | Name | Date |
|---|---|---|
| 1,443,567 | Dornier | Jan. 30, 1923 |
| 1,742,461 | Cuddy | Jan. 7, 1930 |
| 1,766,390 | Lapin | June 24, 1930 |
| 2,176,476 | Twining | Oct. 17, 1939 |
| 2,437,684 | Custer | Mar. 16, 1948 |
| 2,476,482 | Custer | July 19, 1949 |
| 2,532,482 | Custer | Dec. 5, 1950 |